July 15, 1958  R. A. FOOR  2,843,721
MATERIAL FEEDING DEVICE
Filed April 6, 1955

Ronald A. Foor INVENTOR.

BY

William H Brown

2,843,721
MATERIAL FEEDING DEVICE

Ronald A. Foor, Lakewood, Ohio, assignor to The Harshaw Chemical Company, Cleveland, Ohio, a corporation of Ohio Application April 6, 1955, Serial No. 499,694

2 Claims. (Cl. 219—44)

This invention relates to material feeding and more specifically to the problem of feeding molten material for decoration of ceramic ware by the screen process.

In recent years there has come into extensive use a type of screen process which involves the use of molten composition for supply to the screen at a temperature substantially above the temperature of the ware to be decorated. When the molten composition comes into contact with the ware, after being fed thereto through the screen, it is quickly chilled below its freezing point, resulting in that the ware can be handled and further processed without waiting for the decorating material to dry. In operating a process of this type, it is necessary to supply the meltable material to the screen in molten or plastic condition and in order to accomplish this purpose and at the same time feed the material in a suitably regulated amount, it is desirable to supply the decorating material at the proper temperature rather quickly and to cut off the supply rather quickly. This can be done by maintaining a relatively large body of material in molten or suitably plastic state but this is undesirable both from the standpoint of size of equipment and overheating of the decorating composition. It is desirable therefore to hold the supply of decorating material in solid condition and melt it or bring it to the desired plasticity in very short time and to cut off the supply very quickly.

Accordingly, the principal object of the present invention is to provide a feeder for material of the kind indicated which will rapidly convert solid material into molten or highly plastic material and supply the same as needed without the use of valves or cut-offs which can become clogged and inoperative. More specifically, an object of the invention is to provide a receptacle with an electrically heated wall supporting solid decorating material whereby a considerable area of heating surface can be provided which will yield a substantial flow of molten material very quickly without storing any large quantity thereof in molten state. A further object is to provide a heating wall composed of wire mesh having a portion open for the passage of molten material therethrough and a portion occluded to prevent passage of the molten material therethrough while affording heating area.

Other and more limited objects will be in part apparent and part pointed out hereinafter in connection with the accompanying drawings.

Figure 1:
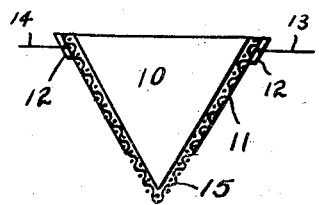
Fig. 1 is a transverse section of one form of material feeding device in accordance with the invention.

Referring now to the drawings, the numeral 10 indicates an end wall of a hopper, it being understood that the other end wall is of the same size and shape. Secured to the end walls is a wire mesh fabric 11 which extends from the uppermost corners of the end walls downwardly to the bottom corner and thence upwardly to the other upper corner. Conductive elements 12 are electrically secured to the upper edges of the wire mesh walls 11 whereby electric current may be passed, for example, through the conductor 13 to the metallic strip 12 which extends along one upper edge and through the wire mesh 11 to the other strip 12 and through the conductor 14 back to the source of current. The wall 11 may be occluded as by electrically non-conductive plastic material throughout the upper portions thereof leaving the lower portions 15 open for the passage of molten material therethrough.

Figure 2:
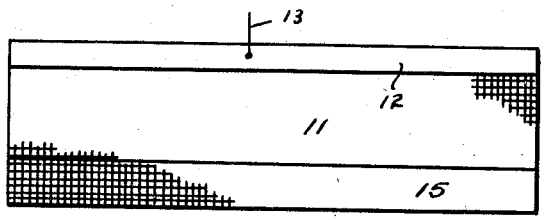
Fig. 2 is a side view thereof.

It will be seen that when the hopper of Figs. 1 and 2 is filled or partially filled with solid meltable material which may be in the form of granules, pellets, cakes, sticks, or the like, these will contact the electrically heated mesh 11 and molten material will flow downwardly both on the inner and outer surfaces of the wire mesh and flow off the bottom of the hopper. In the event the upper portion of the wire mesh wall is occluded as indicated in the drawings with material which is solid at temperatures above the melting point of the decorating material, the molten material may not flow through the mesh until it has progressed downwardly to the portion 15 which is not occluded. By placing the hopper above a screen used for the screen decoration process, it is obvious that decorating material can be quickly supplied when the current is turned on and the flow thereof will quickly stop when the current is turned off.

Figures 3, 4:
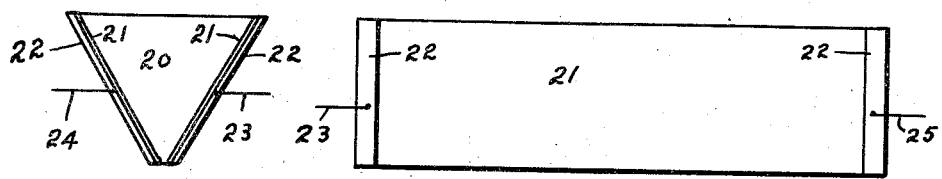
Fig. 3 is an end elevation of a modified form of the invention.
Fig. 4 is a side elevation thereof.

Another form of the invention is shown in Figs. 3 and 4 where instead of wire mesh there is utilized a metallic plate preferably composed of high resistance material. Material which is electrically conductive and not of extremely high resistance can be used if the walls are made sufficiently thin. In Fig. 3 the end wall 20 is of approximately the same shape as the end wall 10 of Fig. 1 but instead of utilizing wire mesh for the heating, thin plates 21, which may be composed of steel or stainless steel or other metal are attached to the end walls and provided at each end with metal strips 22 to which conductors 23, 24, and 25 may lead to the two sides of a source of current, a suitable switch being interposed for the purpose of turning the current on and off. It will be understood that the strips 22 like the strips 13 are of low resistance so that current may be distributed over the plates 21 similarly as in the case of the mesh 11 and the low resistance strips 12. It will be noted that the heating walls 21 are spaced apart at the bottom to provide a discharge outlet for molten decorating material. It will be understood that the walls 21 may be connected to the source of current in parallel with each other or in series and that switches may be inserted in any of conductors 13, 14, 23, 24 and 25.

It will be understood that the decorating material may be of any suitable composition. It preferably is composed of organic waxy material having admixed therewith a glassy frit and a pigment. The composition should be solid at room temperature and should melt at a reasonably small elevation in temperature above normal room temperature. Such compositions are in commercial use and do not of themselves form any part of the present invention.

From the foregoing, it will be seen that I have provided a material feeding device which is well adapted for its intended purpose and while I have shown and described the present preferred embodiment of my invention, it is to be understood that the structure may be varied without departing from the scope of the invention.

Having thus described the invention, what I claim is:

1. A molten material feeder for normally solid ceramic decorating material comprising an elongated V-shaped receptacle having wire mesh screen side wall portions continuous with each other and capable of confining solid ceramic decorating material therein, terminal strips of metal electrically connected to said screen side wall portions along the upper edges thereof, means for passing electricity from one of said strips through the screen side wall portions to the other strip to heat same whereby solid ceramic decorating material adjacent thereto is melted, and means for discontinuing the passage of said electricity thereto.

2. A feeder as defined in claim 1 further characterized in that the upper portions of the wire mesh screen on each side wall portion have the openings occluded by plastic electrically nonconductive material.

References Cited in the file of this patent

UNITED STATES PATENTS

| | | |
|---|---|---|
| 475,442 | Cuttriss | May 24, 1892 |
| 658,601 | Timar | Sept. 25, 1900 |
| 1,954,732 | Gossler | Apr. 10, 1934 |
| 2,244,267 | Slayter | June 3, 1941 |
| 2,405,103 | Winn | July 30, 1946 |
| 2,649,487 | Phillips | Aug. 18, 1953 |

FOREIGN PATENTS

| | | |
|---|---|---|
| 354,763 | Great Britain | Aug. 10, 1931 |
| 823,535 | France | Oct. 18, 1937 |